May 6, 1930.  E. H. GREIBACH  1,757,625
ELECTRICAL MEASURING INSTRUMENT
Filed Oct. 20, 1927
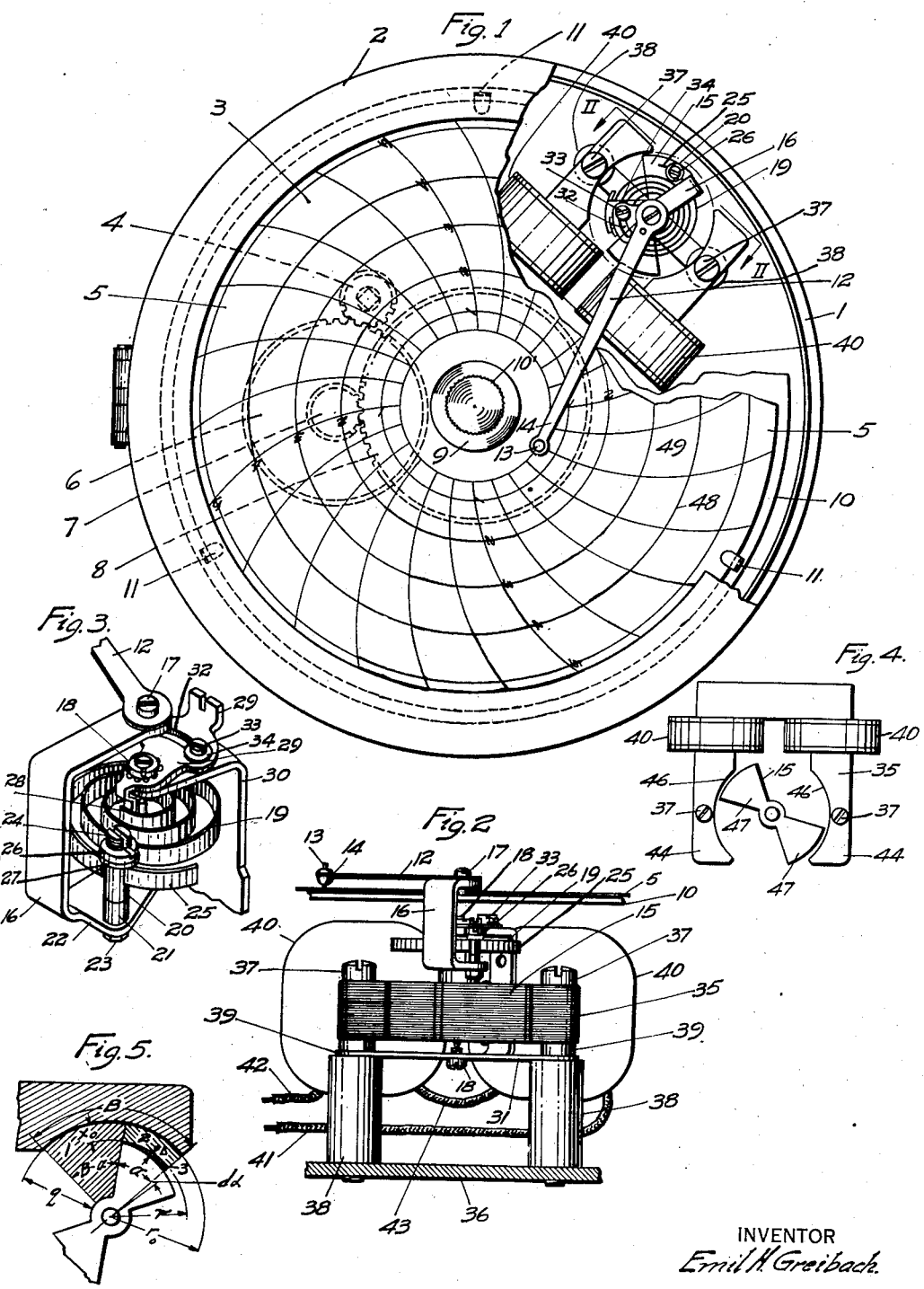
INVENTOR
Emil H. Greibach.
BY
Wesley G. Carr
ATTORNEY Patented May 6, 1930

1,757,625

UNITED STATES PATENT OFFICE

EMIL H. GREIBACH, OF WILKINSBURG, PENNSYLVANIA, ASSIGNOR TO WESTINGHOUSE ELECTRIC & MANUFACTURING COMPANY, A CORPORATION OF PENNSYLVANIA

ELECTRICAL MEASURING INSTRUMENT

Application filed October 20, 1927. Serial No. 227,438.

My invention relates to electrical measuring instruments and more particularly to a magnetically operated structure for controlling deflection of a member.

My invention resides in apparatus for recording or indicating the magnitude of electrical quantities, such as amperes or volts, in a simplified and accurate manner, and it is characteristic of my invention that it is relatively inexpensive to manufacture and operate.

A characteristic of apparatus constructed in accordance with my invention is the driving of a stylus, or other deflecting member, directly by a high-torque laminated armature in increments conforming substantially to the magnitude of the increments of the energization.

A further characteristic of my invention is the avoidance of undesirable noises and rattles which, otherwise, would be caused by the vibration of the armature.

It is a desirable feature of my invention that all of the elements of the device, including clock, record-receiving surface and measuring instrument, may be mounted in a relatively small casing of drum-shape, thereby providing a compact and a very inexpensive meter.

Heretofore, as is well known in the art, recording electric meters have been very expensive by virtue of the fact that a great number of complicated interfitting portions have been required in their construction.

Because of the delicate moving portions of the usual indicating meter, it has been necessary to provide auxiliary means for moving a stylus or pen in accordance with the movement of the indicating device, on account of the low torque of the latter. Such external driving means usually take the form of a worm screw that is driven by a motor which is, in turn, controlled by the moving element of the indicating instrument.

Heretofore, also, the pen and ink-feeding devices have constituted undesirable features in the usual recording instrument.

In accomplishing the primary purpose of my invention, i. e., to provide a graphically recording measuring instrument that shall be relatively simple in construction and inexpensive in cost, I have discovered that inking devices may be discarded and a pencil substituted therefor.

The complicated and expensive translating means of the prior art between the stylus and the controlling instrument may be eliminated by driving the pencil stylus directly from the movable element through magnetically operated mechanism constructed in accordance with my invention. The problem presented for solution, however, was difficult, because, in the first place, a uniform scale was desirable, while, in the second place, a high torque was necessary to drive the stylus, whereas, in order to achieve low cost and simplicity, it was also necessary that the measuring instrument should be small and compact.

In accordance with my invention, I solve such problem by moving an armature of novel shape by magnetic induction and driving a stylus directly by said armature over a moving record-receiving surface.

I have found that such an armature may be modified to move the stylus over a substantially uniform scale by shaping it in the form of a fan having a plurality of blades, the outer peripheral contours of which are in the form of arithmetic spirals that cooperate, respectively, with the substantially circular inner surfaces of a laminated stationary core, all as will be more fully set forth hereinafter.

Apparatus embodying my invention is illustrated in the accompanying drawings, in which:

Figure 1 is an elevational view of an electrical recording instrument constructed in accordance with my invention, portions thereof being broken away for clearness of illustration.

Fig. 2 is a view, in side elevation, of the measuring instrument shown in Fig. 1, taken on the line II—II.

Fig. 3 is an elementary perspective view of the restraining spring structure shown in Figs. 1 and 2.

Fig. 4 is an elementary plan view of the stationary and movable laminated elements of the instrument shown in Figs. 1 and 2, and
Fig. 5 is a diagrammatic view of a portion of the device shown in Fig. 4.

Referring to Fig. 1, 1 is a casing having a door 2 that is provided with a glass window 3 of the usual type. The casing 1, preferably of drum shape, is provided with a relatively heavy base plate to provide a good mounting means on which to assemble the elements of the device.

A clock or other constant-speed actuating device 4 is mounted within the casing 1 to drive a suitably calibrated record-receiving surface or member 5, for example, through speed-reducing gear wheels 6, 7 and 8. The gear wheel 8 preferably drives a spindle 9 that extends through a plate 10 having a plane surface over which the member 5, preferably in the form of a paper disc, rotates. The member 5 is removably secured to the spindle 9 in any suitable manner, as, for example, by a thumb screw 10, threaded to the latter. The outer peripheral edges of the member 5 are guided, preferably, by members 11 of substantially L-shape, preferably press-punched out of the plate 10.

A stylus 12, having a marking member 13, such as a lead-pencil point secured to its outer extremity 14, moves in accordance with the movement of an armature 15. The stylus 12 comprises a flexible arm that is preferably of flat strip steel having a bias toward the plate 10. The stylus 12 may be secured to the armature 15 in any suitable manner, as, for example, by an arm 16 of substantially U-shape, which is rigidly secured at one end to the armature 15, and at the other end to the stylus 12 by a screw 17. The armature 15 is preferably pivoted between upper and lower jewel screws 18. The coil spring 19 for restraining movement of the armature 15 is preferably secured, at one end, to the member 16 by a freely turnable member 20.

The freely turnable member 20 for obviating lateral thrusts of the spring 19 is a novel feature of my invention and is rotatably mounted within a bushing 21 secured to the portion 22 of the arm 16 in which the member is retained by a threaded nut 23. The member 20 is provided with a slot 24 for the reception of the end 25 of the spring 19.

The end 25 of the spring 19 is adjustably retained in the slot 24 in any suitable manner, as, for example, by a nut 26 and a washer 27 cooperatively engaging the member 20 and the said end 25. The full-scale magnitude may be changed by varying the length of the spring 19 by means of the nut 26 and washer 27. In addition to providing a full-scale adjustment of the stylus 12 in providing means for adjusting the length of the spring 19, the member 20 performs another novel and very important function, i. e., it obviates rattling noises incident to the spring 19, by removing all strains, except tortional strains, from the latter.

The other end 28 of the spring 19 is secured to an adjustable arm 29 that is mounted on a stationary member 30 of the frame 31 of the instrument. The member 29 is provided with a slot 32, whereby it may be rotated about the jewel screw 18 as a pivot and adjustably secured in any desired position by a screw 33, that is, threaded to the member 30 and adapted to extend through the slot 32.

A washer 34 may be provided between the head of the screw 33 and the sides of the slot 32 to help retain the member 29 in position. By moving the member 29 to the right or to the left, the zero position of the stylus 12 may be adjusted as desired.

The armature 15, preferably, is turned by magnetic lines of force from a laminated stationary core 35 that is secured to the base 36 of the casing 1, in any suitable manner, as, for example, by bolts, 37, threaded through the base 36. The frame 31 may also be retained in position by said bolts 37, on which, between the base 36 and the frame 31, the spacers 38 are disposed. Spacers 39 are disposed between the frame 31 and the laminated core 35 to retain the latter in proper position with respect to the base 36.

The stationary core 35 may be energized in any suitable manner, as, for example, by coils 40 disposed around the latter.

A current proportional to an electrical quantity, the magnitude of which is to be measured, may be passed to the coils 40 in any suitable manner as, for example, through leads 41 and 42. A conductor 43 conducts current between the coils 40.

The core 35 is provided with two extensions 44 that are provided with inwardly facing surfaces 46 of substantially circular shape. The substantially circular inner surfaces 46 of the extensions 44 of the core member 35 are adapted to cooperate with portions 47 of the movable laminated core member 15 that are provided with outer surfaces that are substantially arithmetical spirals.

Because of its shape, the armature 15 is adapted to give a uniform scale, as will now be described. At constant current, the torque tending to move the armature 15 is equal to the increase of the magnetic energy of the system, in accordance with the change in position of the armature 15. The energy of the flux path through the iron is so small that, for all practical purposes, it may be neglected entirely. Therefore, it is only necessary to take the air gaps into consideration. In the following formula:

The magnetic energy W may be divided into three areas 1, 2 and 3, between armature and stator, as shown in Fig. 5.

$$W = 2\frac{1}{8\pi}\int H^2 dv; \quad (1)$$

where $dv$ = the volume element of air gap
$H$ = flux density or magnetomotive force of air.

In order to simplify the evaluation of the integral, the total air gap may be divided over the volumes (1), (2) and (3) and the integration extended over each of the volumes.

Assuming that all of the lines of flux traverse the air gap in radial lines from the center of the armature. The following relations hold:

$$HX = M/2 \ (= \text{constant}) \quad (2)$$

where $X$ = lengths of paths through the air gap
$M$ = total magnetomotive force $$Hdf = d\phi \quad (3)$$

where $df$ = area element of the lines of magnetic force
$\phi$ = flux (total)

when $dv = xdf$ = the volume of any one of the radial magnetic lines of force.

Using the above formulas, the expression for $W$ may be changed to $$W = 2\frac{1}{8\pi}\int H^2 dv \quad (4)$$

$$= 2\frac{1}{8\pi}\int Hx df \ (\text{subst. equal}) \quad (5)$$

$$= \frac{1}{8\pi} M d\phi \quad (6)$$

It is well known that $\phi = M\lambda \quad (7)$ where $M$ = magnetomotive force
$\lambda$ = magnetic conductivity of the paths of flux = $\frac{b}{x}$ Therefore:

$$d\phi = M d\lambda; \text{ for } M \text{ constant}; \quad (8)$$

reducing our equation for $W$;

$$W = \frac{M^2}{8\pi}\int d\lambda \quad (9)$$

Substituting the values for $d\lambda$ of the three air gap volumes (1), (2) and (3) in the proper integration units;

$$W = \frac{M^2}{8\pi}\left[\int_0^{\beta-\alpha}\frac{lr}{2q}d\alpha + \int_{\beta-\alpha}^{\beta}\frac{lr}{2x_0}d\alpha + \int_{\beta-\alpha}^{\beta}\frac{lr}{2\Delta}d\alpha\right] \quad (10)$$

where $l$ = axial length of air gap
$r$ = greatest radius of armature
$q$ = length of air gap between hub and stator cylinder
$\alpha$ = variable angle of that part of armature under the stator.
$\beta$ = the angle subtended by the stator poles.

$x_0$ = the smallest length between the armature and the stator pole surface.
$\Delta$ = the pitch of the spiral contour of the armature inwardly from the circle of radius $r$.

Neglecting the variation of the cross-section of the lines of force between the limiting inner and outer contours, and integrating over the volumes 1 and 2

$$W = \frac{M^2}{8\pi}x\frac{lr}{2\pi}\left[\frac{1}{q}(\beta-\alpha) + \frac{\alpha}{x_0} + \int_{\beta-\alpha}^{\beta}\frac{lr}{2\Delta}d\alpha\right] \quad (11)$$

The torque $T$ of the armature equals the variations of the energy ($W$) with the angle $\alpha$, or $$T = \frac{dW}{d\alpha} = \frac{M^2}{8\pi}x\frac{lr}{2}\left[-\frac{1}{q} + \frac{1}{x_0} + \frac{d}{d\alpha}\int_{\beta-\alpha}^{\beta}\frac{1}{\Delta}d\alpha\right] \quad (12)$$

subst. $\frac{1}{x} + \frac{1}{q} = \psi$ (const.)

$$T = \frac{M^2}{8\pi}x\frac{lr}{2}\left[\psi - \frac{1}{\Delta}\right] \quad (13)$$

$\Delta$ is the only variable in the above equation.

From Equation (13), it may readily be seen that the torque $T$ is proportional to the product of $M^2$ by the expression in the brackets that contains "$\Delta$" as the only variable. A uniform scale may be obtained by causing the armature deflections $\alpha$ to be proportional to the current $I$ that energizes the electromagnetic coils, that is $$I = i\alpha \quad (14)$$

where $I$ = the current threading the coils
$i$ = the current in amperes per degree deflection
$\alpha$ = the angle of deflection.

A uniform scale is obtained by causing $\Delta$ to fulfill the following equation:

$$I = K\alpha = \frac{\left(\frac{4\pi}{10}ni^2\right)\alpha^2}{8\pi x2}xlr\left[\psi + \frac{1}{\Delta}\right] \quad (15)$$

where $K$ = spring constant in cm. grams per degree deflection.
$n$ = number of turns in the coils Putting $$K\alpha = C\alpha^2\left[\psi + \frac{1}{\Delta}\right] = C\alpha^2\left[\frac{\psi\Delta + 1}{\Delta}\right] \quad (16)$$

solving equation (16)

$$\Delta = \alpha \frac{1}{\left(\frac{K}{c} - \frac{\psi}{\alpha}\right)}$$

The last expression is the equation of the outer periphery of the armature. $\psi$ is very small with respect to $\frac{K}{c}$, therefore, $\psi/\alpha$ may be neglected, especially since the error arising from such neglect is compensated for by the effect of the stray flux that has not, up to this point, been taken into consideration.

The equation for $\Delta$ may therefore be set down:

$$\Delta = \frac{c}{K}\alpha$$

which is the equation for an arithmetic spiral.

The above equation holds true whether the instrument is adapted to measure either current or electromotive force.

The contours of the outer surfaces of the wings of the armature 15 are in the form of arithmetic spirals that cooperate with the substantially cylindrical surfaces 47 of the extensions 44 of the laminated stationary core 35 to cause the stylus 12 to move in substantially uniform increments with uniform increments of energization, permitting a uniform scale to be used on the device.

Similarly, it may be proved that a uniform scale may be obtained by providing a stationary core having a surface in the form of an arithmetic spiral and a movable core having a surface in the form of the arc of a circle.

After the clock 4 is wound, the member 5 is placed over the plate 1 and secured to the member 9 by a thumb piece 10'. The chart 5 is rotated by the clock 4 over the flat face of the plate 10 at a substantially uniform predetermined speed. The leads 41 and 42 are connected in electrical-circuit relation to a source of the quantity to be measured, and the armature 15, moving the stylus 12, causes the lead pencil 13 to mark the magnitude of current traversing the coils 40 on the member 5, which may be provided with circular lines 48 to indicate the magnitude of the quantity to be measured and radial lines 49 to indicate the relative time at which the mark is made.

My invention is particularly concerned with a small and inexpensive recording electrical measuring instrument, but it embodies many other novel features that I consider important; for example, a substantially high-torque armature, means for obtaining a uniform scale, and a substantially silent armature. Such features are of relatively great importance and are fundamental advances in the art.

It will readily be appreciated that many changes may be made in mechanical features embodying my invention without departing from the spirit and scope thereof. I desire to include all such modifications and changes within the spirit and scope of the appended claims.

I claim as my invention:

1. In combination, a plurality of relatively movable members, a spring for opposing motion between said members, and a freely rotatable binding post for securing said spring to one of said members.

2. In combination, a stationary member, a movable member, a spiral spring adjustably secured to said stationary member, and means for securing said spring to said movable member whereby, when the latter is moved, a force is exerted between said spring and said movable member only in the convoluting direction of said spiral.

3. In combination, relatively movable members, a coiled spring for opposing motion between said members, an adjustable member securing said spring to one of said members, and a freely rotatable member for securing said spring to said other member.

4. In an electrical measuring instrument, an indicating device, means for positioning said indicating device in accordance with the characteristic of an electrical quantity, means for restraining the movement of said first-mentioned means including a stationary member, a spiral spring adjustably secured to said stationary member, and means for securing said spring to said first-mentioned means whereby, when the latter is moved, a force is exerted between said spring and said first-mentioned means only in the convoluting direction of said spiral.

5. In a graphic recording instrument, a recording stylus, movable means for positioning said stylus in accordance with the magnitude of an electrical quantity, a stationary member, a coiled spring for restraining the movement of said movable means, an adjustable member securing said spring to said stationary member, and a freely rotatable member for securing said spring to said movable means.

In testimony whereof, I have hereunto subscribed my name this 5th day of October, 1927.

EMIL H. GREIBACH.